United States Patent

Hall et al.

Patent Number: 5,859,768
Date of Patent: Jan. 12, 1999

[54] POWER CONVERSION INTEGRATED CIRCUIT AND METHOD FOR PROGRAMMING

[75] Inventors: Jefferson W. Hall, Phoenix; Jade H. Alberkrack, Tempe, both of Ariz.

[73] Assignee: Motorola, Inc., Schaumburg, Ill.

[21] Appl. No.: 869,297

[22] Filed: Jun. 4, 1997

[51] Int. Cl.$^6$ ............................ H02M 3/335; H02M 3/24; H02H 3/20

[52] U.S. Cl. ............................ 363/21; 363/97; 363/131; 361/90

[58] Field of Search ................................ 363/21, 97, 147, 363/131; 361/90, 91, 92

[56] References Cited

U.S. PATENT DOCUMENTS

| | | | |
|---|---|---|---|
| 4,980,791 | 12/1990 | Alberkrack et al. | 361/90 |
| 5,313,381 | 5/1994 | Balakrishnan | 363/147 |
| 5,335,162 | 8/1994 | Martin-Lopez et al. | 363/97 |

FOREIGN PATENT DOCUMENTS 7325640  12/1995  Japan .

OTHER PUBLICATIONS

SGS–Thomson Microelectronics Data Sheet, "VIPer100, SMPS Primary I.C.", 14 pages.

*Primary Examiner*—Peter S. Wong
*Assistant Examiner*—Rajnikant B. Patel
*Attorney, Agent, or Firm*—Rennie William Dover; Robert D. Atkins

[57] ABSTRACT

A single input pin (48) provides multi-functional features for programming a power supply (10). By connecting the appropriate interface circuit (92, 100, or 112) to the single input pin (48), the power supply (10) is programmed for specific behaviors during power up and toggling of an on/off switch (96, 108). In one mode of operation a light emitting diode (106) in the interface circuit (100) is optically coupled to a microprocessor for signaling the closure of the on/off switch (108), allowing the microprocessor to control the power supply (10) through an opto-coupler (102). In another mode of operation, the single on/off switch (96) controls the power supply (10). In yet another mode of operation, Zener diode (118) in the interface circuit (112) controls the power supply (10) during brown-out and black-out conditions.

20 Claims, 2 Drawing Sheets

POWER CONVERSION INTEGRATED CIRCUIT AND METHOD FOR PROGRAMMING

BACKGROUND OF THE INVENTION

The present invention relates, in general, to integrated circuits and, more particularly, to a power conversion integrated circuit.

A power supply is controlled to be either on or off by a mechanical switch or a relay. Typically, additional discrete components that are external to the integrated circuit adapt the power supply for use in applications such as cable converters for television sets, computer monitors, video cassette recorders (VCRs), battery chargers for portable communications devices, computer printers, and other electronic systems.

Depending on the particular application, the on/off circuitry of a power supply control circuit includes components such as opto-couplers, latches, resistors, and capacitors. Monolithic circuit integration minimizes the number of components external to the integrated circuit and reduces the cost of power supplies. The number and types of external components along with the cost of the integrated circuit package provide functionality that differentiates among different power supplies. Typically, a switching regulator without on/off circuitry is manufactured in a three pin package. A drawback of these three pin package configurations is that they offer limited functionality within the package.

Accordingly, it would be advantageous to have an inexpensive integrated power supply controller that is capable of operating with many different power supplies. It would be of further advantage for the power supply controller to have a minimal number of discrete external components for controlling the power supply on/off switch circuitry.

DETAILED DESCRIPTION OF THE DRAWINGS

Generally, the present invention provides a circuit with at least four modes of operation for controlling the on/off features of a power supply. By connecting an appropriate interface circuit to a state input pin, the power supply is programmed for specific behaviors when power is applied or when the interface circuitry is activated. Thus, the multi-functionality provided by a state circuit that is integrated with a control circuit is a cost effective solution for controlling the power supply.

Figure 1:
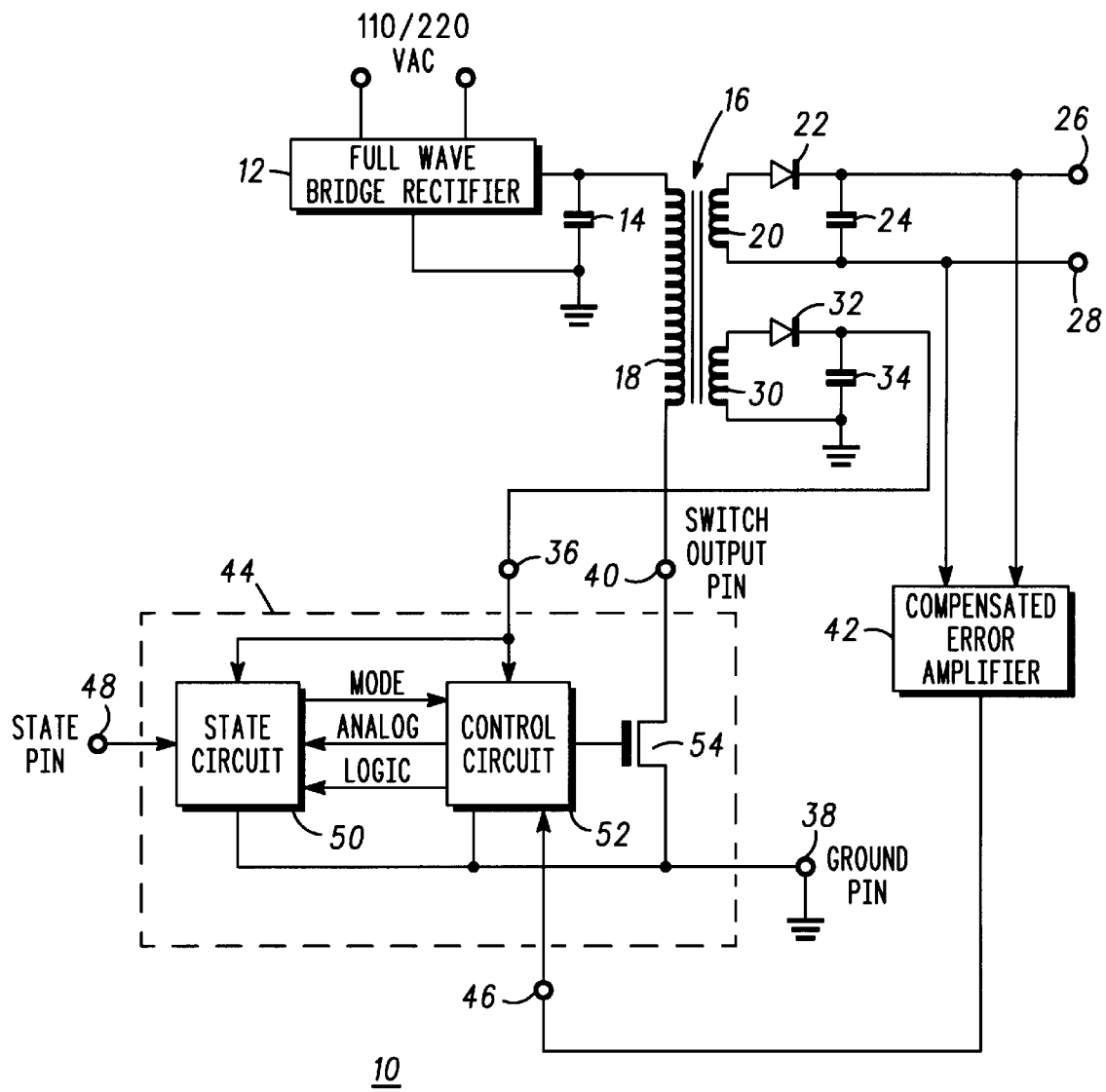
FIG. 1 is a block diagram of a power supply in accordance with an embodiment of the present invention.

FIG. 1 is a block diagram of a power supply 10 in accordance with the present invention. Power supply 10 includes a full-wave bridge rectifier 12, capacitors 14, 24, and 34, diodes 22 and 32, a transformer 16, a compensated error amplifier 42, and a power converter circuit 44. In particular, full-wave bridge rectifier 12 has a ground connection, a pair of inputs for receiving a line voltage, e.g., 110 volts alternating current (VAC), 220 volts VAC, etc. An output of full-wave bridge rectifier 12 supplies a rectified output signal that is filtered by filter capacitor 14. Filter capacitor 14 has a terminal connected to the output of full-wave bridge rectifier 12 and a terminal connected to a power supply potential such as, for example, ground.

Transformer 16 has a primary side or winding 18 having two terminals, a secondary winding 20 having two terminals, and a secondary winding 30 having two terminals. In particular, one terminal of primary winding 18 is connected to the output of full-wave bridge rectifier 12, and the other terminal of primary winding 18 is connected to a switch output pin 40 of power converter circuit 44.

Secondary winding 20 has a first terminal connected to an anode of a diode 22. A cathode of diode 22 is commonly connected to a first terminal of capacitor 24 and to a terminal 26. The second terminal of capacitor 24 is commonly connected to the second terminal of secondary winding 20 and to a terminal 28. Compensated error amplifier 42 has an input connected to terminal 26, an input connected to terminal 28, and an output connected to feedback pin 46.

Secondary winding 30 has a first terminal connected to an anode of diode 32. A cathode of diode 32 is commonly connected to a first terminal of capacitor 34 and to a bias pin 36 of power converter circuit 44. The second terminal of capacitor 34 is commonly connected to the second terminal of secondary winding 30 and to a potential such as, for example, ground.

Power converter circuit 44 is a switched mode power supply integrated circuit or a power conversion integrated circuit having five electrical connection terminals: (1) a bias pin 36, (2) a ground pin 38, (3) a feedback pin 46, (4) a state pin 48, and (5) a switch output pin 40. Power converter circuit 44 is a semiconductor chip that includes a state circuit 50, a control circuit 52 having an internal regulator, and a transistor 54. State circuit 50 has an input connected to bias pin 36 and another input coupled to state pin 48 of power converter circuit 44. Another input of state circuit 50 is connected to an output of control circuit 52 and receives a logic under-voltage control signal (LOGIC). Another input of state circuit 50 receives an analog under-voltage control signal (ANALOG) and is connected to a second output of control circuit 52. An output of state circuit 50 provides a signal MODE and is connected to a control input of control circuit 52. Control circuit 52 has an input connected to bias pin 36 and another input connected to feedback pin 46 of power converter circuit 44. An output of control circuit 52 is connected to a gate of transistor 54. Both state circuit 50 and control circuit 52 are connected to ground pin 38. A drain of transistor 54 is connected to switch output pin 40 and a source is connected to ground pin 38. As those skilled in the art are aware, a gate of a transistor serves as a control terminal and the drain and source of a transistor serve as current conduction terminals. It should be noted that transistor 54 can be an insulated gate bipolar transistor (IGBT), a bipolar transistor, etc.

In operation, the line voltage, e.g., 110 VAC, is rectified by full-wave bridge rectifier 12 and filtered by capacitor 14. Secondary winding 20 provides a signal that is used to supply the operating power to electronic systems such as cable converters, computer monitors, video cassette recorders (VCRs), battery chargers, computer printers, etc. Compensated error amplifier 42 provides a feedback signal to power converter circuit 44 that is proportional to the DC output signal. The output of compensated error amplifier 42 may be optically, electrically, magnetically, mechanically, or other means coupled to feedback pin 46 of power converter circuit 44.

The feedback signal is used by control circuit 52 for altering the pulse width of the signal that is supplied to the control terminal of transistor 54. Thus, compensated error amplifier 42 alters the pulse width of the output signal at switch output pin 40 in accordance with the voltage developed across terminals 26 and 28. The variable pulse width modifies the current in transformer 16, thereby regulating the voltage of the DC output signal. In addition, the bias voltage developed at bias pin 36 from secondary winding 30 can used as the operating supply voltage of state circuit 50 and control circuit 52. The bias voltage developed at bias pin 36 can alternately be derived from secondary winding 20. It should be noted that compensated error amplifier 42 can be replaced with a high gain comparator, or the like.

Figure 2:
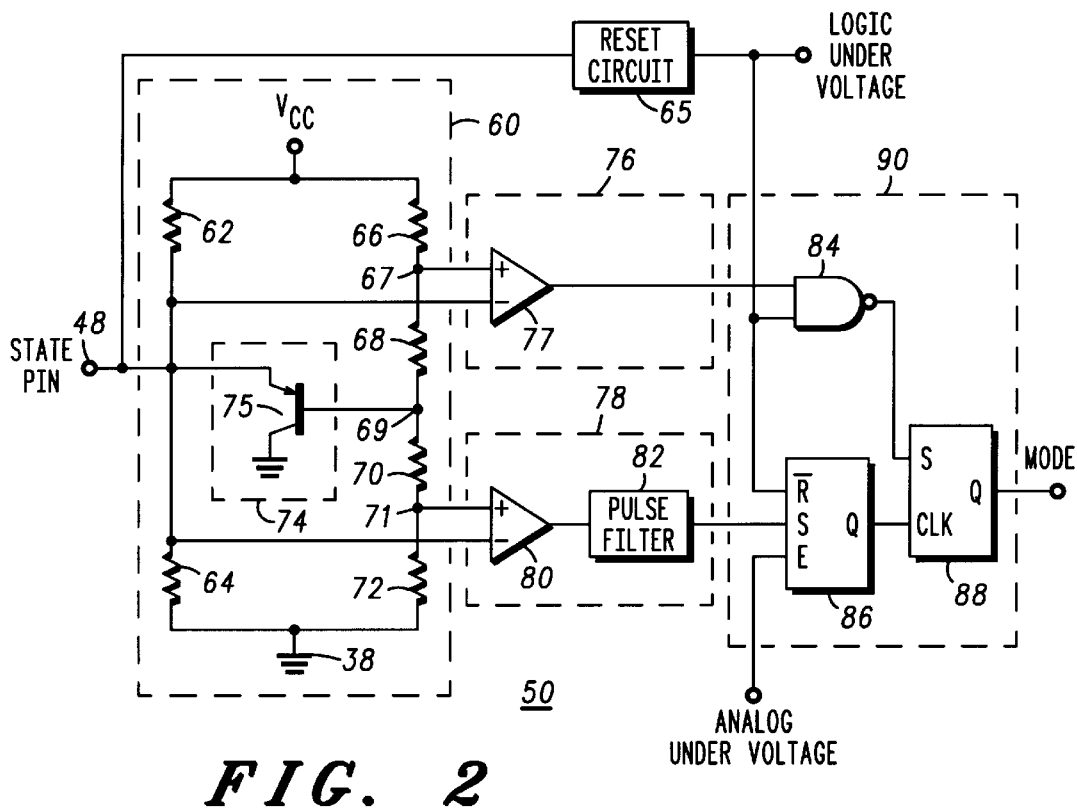
FIG. 2 is a schematic diagram of a state circuit for use in the power supply of FIG. 1.

FIG. 2 is a schematic diagram of state circuit 50 in accordance with the present invention. State circuit 50 includes a reference generator 60, a reset circuit 65, a positive detector circuit 76, a negative detector circuit 78, and a mode memory circuit 90. Positive detector circuit 76 and negative detector circuit 78 are referred to as a comparator circuit. In particular, reference generator 60 includes resistors 62, 64, 66, 68, 70, and 72, and a voltage clamp circuit 74. The first terminals of resistors 62 and 64 are commonly connected to state pin 48 which is connected to an input of state circuit 50. The second terminal of resistor 62 is connected to a power supply conductor which is coupled for receiving a voltage such as, for example, $V_{cc}$, and the second terminal of resistor 64 is connected to a power supply conductor which is coupled for receiving a reference voltage of, for example, ground. The first terminals of resistors 66 and 68 are commonly connected and form a node 67. The second terminal of resistor 66 is connected to the power supply conductor which is coupled for receiving the reference voltage of, for example, $V_{cc}$. The second terminal of resistor 68 and the first terminal of resistor 70 are commonly connected and form a node 69. The second terminal of resistor 70 and the first terminal of resistor 72 are commonly connected and form a node 71. The second terminal of resistor 72 is connected to a power supply conductor which is coupled for receiving a reference voltage of, for example, ground. It should be noted that the power supply conductor connected to ground is also connected to the external ground reference or ground pin 38 of power converter circuit 44 (FIG. 1). Voltage clamp circuit 74 has an input connected to node 69 and an output connected to state pin 48. By way of example, voltage clamp circuit 74 is a PNP transistor 75 having a base terminal connected to the input of voltage clamp 74, an emitter terminal connected to the output of voltage clamp circuit 74, and a collector terminal connected to a potential of, for example, ground.

The resistors 62, 64, 66, 68, 70, and 72 of reference generator 60 (FIG. 2) set reference voltages that determine the logic values of the signals at the outputs of comparators 77 and 80. By way of example, resistor 62 has a value of about 160 kilohms (KΩs), resistor 64 has a value of about 115 KΩs, resistor 66 has a value of about 150 KΩs, resistor 68 has a value of about 19 KΩs, resistor 70 has a value of about 58 KΩs, and resistor 72 has a value of about 55 KΩs. Resistors 62 and 64 form a resistor divider network that provides a voltage of about 2.4 volts at state pin 48 when external components are not connected at that pin. It should be further noted that resistors 66, 68, 70, and 72 form another resistor divider network that provides voltages at nodes 67 and 71 of about 2.9 volts and about 1.1 volts, respectively. The reference voltages described are for a $V_{cc}$ of approximately 5.8 volts. It should be noted that reference generator 60 can be configured with other combinations of resistors or alternately configured with combinations of resistors and semiconductor devices.

Positive detector circuit 76 includes a comparator 77 having a non-inverting input connected to an input of positive detector circuit 76, and thus to node 67 of reference generator 60. An inverting input of comparator 77 is connected to an input of positive detector circuit 76 and thus to state pin 48 of reference generator 60. An output of comparator 77 is connected to an output of positive detector circuit 76. Negative detector circuit 78 includes a comparator 80 connected to a pulse filter 82. Comparator 80 has a non-inverting input connected to an input of negative detector circuit 78 and thus to node 71 of reference generator 60. An inverting input of comparator 80 is connected to an input of negative detector circuit 78 and thus to state pin 48 of reference generator 60. An output of comparator 80 is coupled to an output of negative detector circuit 78 through pulse filter 82.

Reset circuit 65 receives an input signal LOGIC UNDER-VOLTAGE and has an output connected to state pin 48.

Mode memory circuit 90 includes a two-input NAND gate 84, a logic circuit 86, and a positive edge triggered toggle flip-flop 88. In particular, two-input NAND gate 84 has an input connected to the output of positive detector circuit 76, the other input is coupled for receiving the signal LOGIC UNDER-VOLTAGE. When the voltage $V_{cc}$ begins to ramp from a starting voltage of zero volts, the signal LOGIC UNDER-VOLTAGE has an initial logic zero value that is switched to a logic one value at a predetermined voltage. By way of example, the predetermined voltage is a voltage potential that is sufficiently high to allow logic circuitry to properly operate. In other words, the signal LOGIC UNDER-VOLTAGE has a logic one value when the voltage $V_{cc}$ is sufficiently above the predetermined voltage and a logic zero value when below the predetermined voltage.

Logic circuit 86 has an input $\overline{R}$ coupled for receiving the signal LOGIC UNDER-VOLTAGE, an input S connected to the output of negative detector circuit 78, and an enable input E coupled for receiving the signal ANALOG UNDER-VOLTAGE. The signal ANALOG UNDER-VOLTAGE has a logic one value when the voltage $V_{cc}$ is sufficiently high for transistors (not shown) such as, for example, the transistors in comparators 77 and 80, to operate in an analog mode. When the voltage $V_{cc}$ is not high enough for transistors to operate in the analog mode the signal ANALOG UNDER-VOLTAGE has a logic zero value.

It should be noted that when a signal having a logic zero value is received at the input $\overline{R}$ of logic circuit 86, the output signal at output Q of logic circuit 86 has a logic zero value. It should be further noted that when a signal having a logic one value is received at the input S of logic circuit 86, the output signal at output Q of logic circuit 86 has a logic one value. Should logic circuit 86 receive both a signal having a logic zero value at the input $\overline{R}$ and a signal having a logic one value at the input S, the circuit responds to the signal received at the input $\overline{R}$. In other words, when both a set and a reset occur together, the reset function has precedence. It should be noted that the output Q can only transition from a logic zero value to a logic one value when the enable input, i.e., the signal ANALOG UNDER-VOLTAGE, is a logic one.

Toggle flip-flop 88 has an input S connected to the output of NAND gate 84, an input CLK connected to the output of logic circuit 86, and an output that also serves as the output of state circuit 50. It should be noted that the output signal of toggle flip-flop 88 can be set to a logic one value when the input S receives a logic one signal. Otherwise, the stored value of the output signal changes output state in response to logic transitions at input CLK, i.e., the stored value is toggled when the input CLK transitions from a logic zero value to a logic one value. It should be noted that if the signal at the input CLK transitions while the signal at input S is a logic one, then flip-flop 88 responds to a logic one signal at input S and ignores the signal at the input CLK.

In operation, the power supply conductor $V_{cc}$ initially starts at a voltage of about zero volts and ramps to a higher voltage value, increasing in voltage to a voltage greater than 5.8 volts. As the voltage $V_{cc}$ begins to ramp from zero volts, the signals LOGIC UNDER-VOLTAGE and ANALOG UNDER-VOLTAGE initially have logic zero values. The signal LOGIC UNDER-VOLTAGE is set to a logic one when the voltage $V_{cc}$ exceeds about 3.5 volts. The signal ANALOG UNDER-VOLTAGE is set to a logic one value when the voltage $V_{cc}$ exceeds about 4.8 volts.

In a first operating mode, no external components are connected to state pin 48. With the application of the line voltage, the voltage for $V_{cc}$ increases from zero volts. The signal LOGIC UNDER-VOLTAGE has a logic zero value when the voltage $V_{cc}$ is in the range of about 0 volts to about 3.5 volts. The logic zero value for the signal LOGIC UNDER-VOLTAGE causes both the output of logic circuit 86 to have a logic zero value and the output of toggle flip-flop 88 to have a logic one value. When the signal LOGIC UNDER-VOLTAGE is at a logic zero value, input state pin 48 is pulled to ground through reset circuit 65. When the voltage $V_{cc}$ increases above a voltage of about 3.5 volts the output of reset circuit 65 becomes a high impedance output. With no external components, the voltage at state pin 48 is determined by the values of resistors 62 and 64. In this first mode of operation the voltage on state pin 48 is between the reference voltages at nodes 67 and 71, the signal at the output of comparator 77 has a logic one value, and the output of comparator 80 has a logic zero value. Thus, the signal MODE is a logic one and power supply 10 (FIG. 1) is on.

Figure 3:
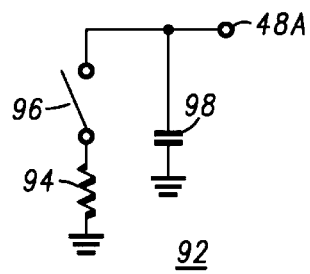
FIG. 3 is a schematic diagram of an interface switch circuit for use with the state circuit of FIG. 1 in accordance with another embodiment of the present invention.

FIG. 3 is a schematic diagram of an interface switch circuit for use with the state circuit of FIG. 1 in accordance with another embodiment of the present invention. In a second operating mode, switch interface circuit 92 is connected to state circuit 50 for controlling the operation of power supply 10 (FIG. 1). Briefly referring to FIG. 3, switch interface circuit 92 includes a resistor 94, a push-button or mechanical switch 96, and a capacitor 98. In particular, a first terminal of resistor 94 is connected to a first terminal of switch 96. The second terminal of resistor 94 is connected to a power supply conductor that is coupled for receiving a voltage such as, for example, ground, and the second terminal of switch 96 is connected to a first terminal of capacitor 98, forming node 48A. Node 48A is connected to state pin 48 in this mode of operation. The second terminal of capacitor 98 is connected to a power supply conductor such as, for example, ground.

The reference voltage or reference signal at node 67 is transmitted to the non-inverting input of comparator 77 and the voltage at state pin 48 is transmitted to the inverting input of comparator 77. If the voltage at state pin 48 is less than the reference voltage at node 67, the output of comparator 77 is a logic one value. On the other hand, if the voltage at state pin 48 is greater than the reference voltage at node 67, the output of comparator 77 is a logic zero value. The reference voltage or reference signal at node 71 is transmitted to the non-inverting input of comparator 80 and the voltage at state pin 48 is transmitted to the inverting input of comparator 80. If the voltage at state pin 48 is greater than the reference voltage at node 71, the output of comparator 80 is a logic zero value. On the other hand, if the voltage at state pin 48 is less than the reference voltage at node 71, the output of comparator 80 is a logic one value. Together, comparators 77 and 80 determine whether the voltage at state pin 48 is between the reference voltages at nodes 67 and 71.

In the second mode of operation, switch 96 allows for manually controlling whether power supply 10 (FIG. 1) is in an on-operating state or an off-operating state. Initially, the signals LOGIC UNDER-VOLTAGE and ANALOG UNDER-VOLTAGE have logic zero values. The signal LOGIC UNDER-VOLTAGE causes the output of logic circuit 86 to have a logic one value, and for state pin 48 to be grounded by reset circuit 65 and discharge capacitor 98. The output of NAND gate 84 is a logic one value that sets the output of toggle flip-flop 88 to a logic one value.

With the application of the line voltage to full-wave bridge rectifier 12, the voltage $V_{cc}$ (see FIG. 2) is increased from the starting voltage of zero volts. As the voltage for $V_{cc}$ increases above about 3.5 volts the signal LOGIC UNDER-VOLTAGE changes to a logic one value. In addition, the output of reset circuit 65 becomes high impedance allowing capacitor 98 to charge. A further increase in the voltage $V_{cc}$ above about 4.8 volts causes the signal ANALOG UNDER-VOLTAGE to be set to a logic one value which enables logic circuit 86. The output of comparator 80 being at a logic one value signifies that capacitor 98 is at a value that is less than the voltage at node 71. The logic one value at the output of comparator 80 causes the output of logic circuit 86 to transition from a logic zero value to a logic one value. When the logic zero value at the CLK input transitions to a logic one value the previously stored value of toggle flip-flop 88 is toggled. Thus, the output signal MODE has a logic zero value and power supply 10 is in an off state.

When switch 96 is closed, capacitor 98 is discharged through switch 96 and resistor 94. The voltage at state pin 48 drops below the reference voltage at node 71 causing comparator 80 to provide a logic one to input S of logic circuit 86. The output of logic circuit 86 transitions to a logic one value causing toggle flip-flop 88 to change states such that the signal MODE is a logic one value and power supply 10 is in an on state. With each closure of switch 96 the output of logic circuit 86 transitions from a logic zero to a logic one causing the stored data in toggle flip-flop 88 to change state, provided that capacitor 98 was charged above the reference voltage at node 71.

Figure 4:
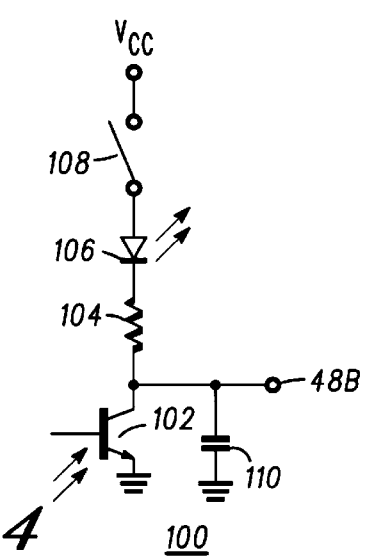
FIG. 4 is a schematic diagram of a microprocessor interface switch circuit for use with the state circuit of FIG. 1 in accordance with yet another embodiment of the present invention.

FIG. 4 is a schematic diagram of a microprocessor interface switch circuit for use with the state circuit of FIG. 1 in accordance with another embodiment of the present invention. In a third operating mode, a microprocessor interface switch circuit 100 (FIG. 4) is connected to state circuit 50 (FIG. 2) for controlling the operation of power supply 10 (FIG. 1). A first terminal of capacitor 110 and the collector terminal of opto-coupler 102 are commonly connected, forming node 48B. Node 48B is connected to state pin 48 of state circuit 50. The second terminal of capacitor 110 and the emitter terminal of opto-coupler 102 are connected to a power supply conductor at a potential of, for example, ground. The base terminal is coupled for receiving a coded light signal. Resistor 104 has a terminal connected to state pin 48 and the other terminal connected to a cathode of LED 106. An anode of LED 106 is connected to a first terminal of switch 108. A second terminal of switch 108 is connected to a power supply conductor coupled for receiving a voltage such as, for example, $V_{cc}$. It should be noted that switch 108 may be a push-button switch that is closed while the button is depressed, i.e., a momentary closure.

In the third mode of operation, state circuit 50 is powered on such that the signal MODE has a logic zero value. Capacitor 110 delays the charging of state pin 48 so that the output of comparator 80 has a logic one value, which turns off power supply 10. The momentary closure of switch 108 causes LED 106 to emit light and transmit a signal to, for example, a microprocessor (not shown). When switch 108 is closed, state pin 48 is pulled high through switch 108, LED 106, and resistor 104. The voltage at state pin 48 is clamped by voltage clamp circuit 74 such that LED 106 is always forward biased and emitting light when switch 108 is closed. When switch 108 is closed the output of comparator 77 becomes a logic zero value signifying that the voltage on state pin 48 is above the reference voltage established at node 67 by the resistor divider network. The logic zero value sets the signal MODE to a logic one value for turning on power supply 10 (FIG. 1).

When the signal MODE is a logic one and power supply 10 is on, another momentary closure of switch 108 signals the microprocessor through light emitted by LED 106 of a request to shut down power supply 10. The microprocessor can signal through opto-coupler 102 a confirmation to shut down power supply 10. If signaled by the microprocessor, opto-coupler 102 pulls state pin 48 to ground and the output of comparator 80 becomes a logic one signifying that the voltage on state pin 48 is below the reference voltage at node 71 of reference generator 60. The output of logic circuit 86 transitions to a logic one value causing toggle flip-flop 88 to change states such that the signal MODE is a logic zero value and power supply 10 is off. The microprocessor "reads" each momentary closure of switch 108 by the light emitted from LED 106. The state of toggle flip-flop 88 is changed in accordance with the signal received by opto-coupler 102. Thus, the momentary closure of switch 108 allows the microprocessor to control when power supply 10 is turned on or turned off.

Figure 5:
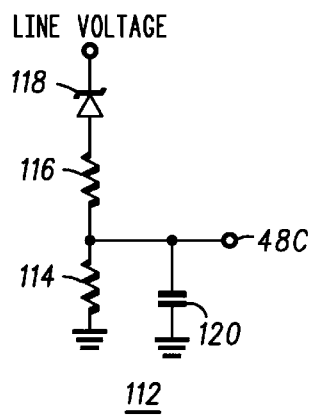
FIG. 5 is a schematic diagram of a brown-out interface circuit for use with the state circuit of FIG. 1 in accordance with yet another embodiment of the present invention.

FIG. 5 is a schematic diagram of a brown-out interface circuit for use with the state circuit of FIG. 1 in accordance with yet another embodiment of the present invention. This fourth operating mode includes using brown-out interface circuit 112 (FIG. 5) with state circuit 50 (FIG. 2) for controlling the operation of power supply 10 (FIG. 1). Briefly referring to FIG. 5, resistor 114 has a first terminal commonly connected to a first terminal of resistor 116 and to a terminal of capacitor 120, forming node 48C. Node 48C is connected to state pin 48 of state circuit 50. A second terminal of resistor 114 is connected to a power supply conductor such as, for example, ground. The other terminal of capacitor 120 is connected to a power supply conductor which is operating at a potential of, for example, ground. The second terminal of resistor 116 is connected to an anode of Zener diode 118. A cathode of Zener diode 118 is connected to a voltage such as, for example, a rectified line voltage.

In the fourth mode of operation, state circuit 50 is powered on and the signal MODE is at a logic one value. The output of comparator 77 has a logic zero value indicating that the voltage on state pin 48 has a value above the reference voltage at node 67. The logic zero value at the input of NAND gate 84 causes the signal MODE to have a logic one value and power supply 10 (FIG. 1) to be on. Brown-out interface circuit 112 (FIG. 5) detects either a brown-out or a black-out condition on the line voltage received by full-wave bridge rectifier 12 (FIG. 1). A brown-out occurs when the line voltage is below the predetermined rectified voltage as set by Zener diode 118. A black-out occurs when the line voltage is substantially zero volts. By way of example, Zener diode 118 has a reverse bias voltage of about 80 volts. During either a brown-out or a black-out, about 80 volts is dropped across Zener diode 118. The resistor values for resistors 114 and 116 are selected to cause the voltage on state pin 48 to drop below the reference voltage at node 71 of reference generator 60 during either a brown-out or a black-out condition. The output of comparator 80 transitions to a logic one value during either a brown-out or black-out. The output of logic circuit 86 transitions to a logic one value, causing toggle flip-flop 88 to change states from a logic one value to a logic zero value, thereby turning off power supply 10. When neither the brown-out nor the black-out condition is present, pin 48 is pulled high. The output of comparator 77 is a logic zero value when the voltage at state pin 48 is above the reference voltage at node 67. A logic one value at the input S of toggle flip-flop 88 causes the signal MODE to be a logic one value, thereby turning off power supply 10.

State circuit 50, interface circuits 92 and 100 have been described with references with respect to ground. It should be noted that logic in state circuit 50 and interface circuits 92 and 100 can be reconfigured to function with respect to the reference voltage $V_{cc}$. It should be further noted that state circuit 50 can also be reconfigured to function with opposite polarity logic at state pin 48.

It should be noted that capacitors 98, 110, and 120 as described in FIGS. 3, 4, and 5 can be selected to assure that power supply 10 is initially programmed in the off state when the line voltage is applied. On the other hand, power supply 10 can be programmed in the on state when the line voltage is applied by removing capacitors 98, 110, and 120. It should be further noted that capacitors 98, 110, and 120 can be selected to provide noise immunity without affecting the initially programmed on/off state.

By now it should be appreciated that a structure and method have been provided for controlling the on/off status of a programmable power supply. The integrated power supply controller is inexpensive and provides a cost effective system solution for switching power supplies by reducing the number of external components. It has further been shown that additional functionality has been provided through a multi-functional input for controlling the on/off switching function of a power supply.

We claim:

1. A power conversion integrated circuit, comprising:
 a state circuit having an output that supplies a mode signal, wherein the state circuit includes
   a comparator having a first input coupled for receiving a control signal and a second input coupled for receiving a first reference signal, and
   a memory circuit having a first input coupled to an output of the comparator for setting an output state of the memory circuit according to a value of the control signal; and
 a control circuit coupled for receiving the mode signal that sets a mode of operation, where the control circuit is responsive to a feedback signal for providing a pulse-width modulated control signal.

2. The power conversion integrated circuit of claim 1, wherein the comparator includes:

a first comparator having a first input coupled for receiving the control signal, a second input coupled for receiving the first reference signal, and an output coupled to the first input of the memory circuit; and a second comparator having a first input coupled for receiving the control signal, a second input coupled for receiving a second reference signal, and an output coupled to a second input of the memory circuit.

3. The power conversion integrated circuit of claim 2, further including a resistor divider network for generating the first reference signal at a first output and the second reference signal at a second output.

4. The power conversion integrated circuit of claim 3, wherein the resistor divider network includes:

a first resistor having first and second terminals, the first terminal of the first resistor coupled to a first power supply conductor;

a second resistor having first and second terminals, the first terminal of the second resistor coupled to the second terminal of the first resistor and serving as the first output of the resistor divider network; and a third resistor having first and second terminals, the first terminal of the third resistor coupled to the second terminal of the second resistor and serving as the second output of the resistor divider network, and the second terminal of the third resistor coupled to a second power supply conductor.

5. The power conversion integrated circuit of claim 4, further including a pulse filter having an input coupled to the output of the second comparator and an output coupled to the second input of the memory circuit.

6. The power conversion integrated circuit of claim 1, wherein the memory circuit has at least one storage element for storing an operating mode of the power conversion integrated circuit.

7. The power conversion integrated circuit of claim 1, further including a reset circuit having an input coupled to a logic under voltage signal and an output coupled to the control signal.

8. A semiconductor chip having at least four external electrical connections, comprising:

an internal regulator; a state circuit having an output coupled to a control input of the internal regulator;

a first electrical connection terminal for coupling an external ground reference to an internal ground reference of the internal regulator;

a second electrical connection terminal for providing a pulse-width modulated output signal from an output of the internal regulator;

a third electrical connection terminal coupled for receiving a feedback signal at an input of the internal regulator to control the pulse-width modulated output signal; and a fourth electrical connection terminal coupled for receiving a control signal which is applied to the state circuit to set a mode of operation of the internal regulator.

9. The semiconductor chip of claim 8, further comprising a fifth electrical connection terminal coupled for receiving a bias voltage which is applied to the state circuit and to the internal regulator.

10. A programmable power supply, comprising:

a transformer receiving a rectified signal at a primary side of the transformer;

a state circuit having an input and an output for setting a mode of operation of the programmable power supply, wherein the state circuit includes, a comparator circuit having a first input coupled to the input of the state circuit for receiving a control signal and a second input coupled for receiving a first reference signal, and a memory circuit having a first input coupled to an output of the comparator for setting an output state of the memory circuit according to a value of the control signal where the output state of the memory circuit controls the mode of operation;

a control circuit coupled for receiving the output state of the memory circuit and wherein the control circuit is responsive to a feedback signal for providing a pulse-width modulated control signal; and a transistor having a control terminal for receiving the pulse-width modulated control signal, a first conduction terminal coupled to the primary side of the transformer, and a second conduction terminal coupled to ground.

11. The programmable power supply of claim 10, wherein the comparator circuit includes:

a first comparator having a first input coupled for receiving the control signal, a second input coupled for receiving the first reference signal, and an output coupled to the first input of the memory circuit; and a second comparator having a first input coupled for receiving the control signal, a second input coupled for receiving a second reference signal, and an output coupled to a second input of the memory circuit.

12. The programmable power supply of claim 10, further including a resistor divider network for generating a first reference signal at a first output and a second reference signal at a second output.

13. The programmable power supply of claim 12, wherein the resistor divider network includes:

a first resistor having first and second terminals, the first terminal of the first resistor coupled to a first power supply conductor;

a second resistor having first and second terminals, the first terminal of the second resistor coupled to the second terminal of the first resistor and serving as the first output of the resistor divider network; and a third resistor having first and second terminals, the first terminal of the third resistor coupled to the second terminal of the second resistor and serving as the second output of the resistor divider network, and the second terminal of the third resistor coupled to a second power supply conductor.

14. A method for controlling a mode of operation of a power converter, comprising the steps of:

controlling a pulse-width modulated output signal of the power converter in response to a feedback signal; and setting a memory state according to a comparison between a control signal and a first reference signal where the memory state controls the mode of operation of the power converter.

15. The method of claim 14, further comprising the steps of:

monitoring a signal at an input pin; and maintaining a same operating state when the input pin receives a voltage about midway between an operating potential and a ground reference.

16. The method of claim 14, further comprising the steps of requesting an on-operating state when a power supply is off and an input pin receives a voltage greater than a first reference voltage.

17. The method of claim 14, further comprising the steps of requesting a toggle condition when a power supply is on and an input pin receives a voltage greater than a first reference voltage.

18. The method of claim 15, further comprising the steps of requesting that an output state be toggled when a power supply is on and an input pin receives a voltage less than a second reference voltage.

19. The method of claim 14, further comprising the step of operating in an off-operating state when a brown-out occurs that includes receiving a signal that is proportional to a line voltage that is less than a second reference voltage.

20. The method of claim 14, further comprising the step of operating in an off-operating state when a black-out occurs that includes receiving a signal that is proportional to a line voltage that is less than a second reference voltage.

* * * * *